(No Model.)
T. T. & W. O. LUSCOMBE.
FILTER.
No. 485,551. Patented Nov. 1, 1892.
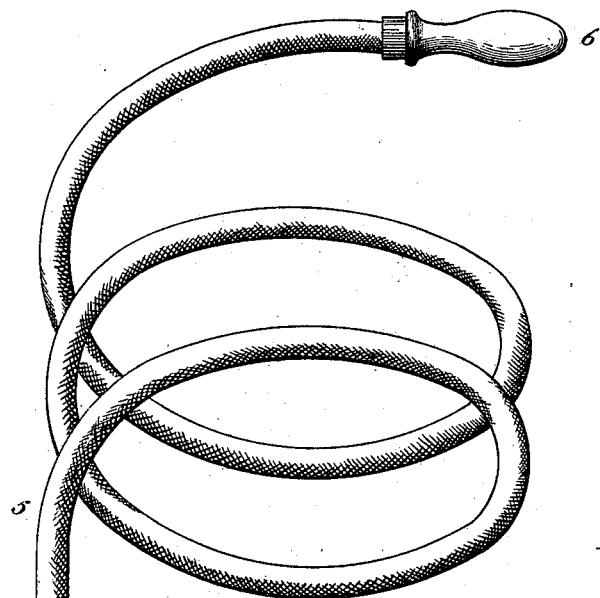
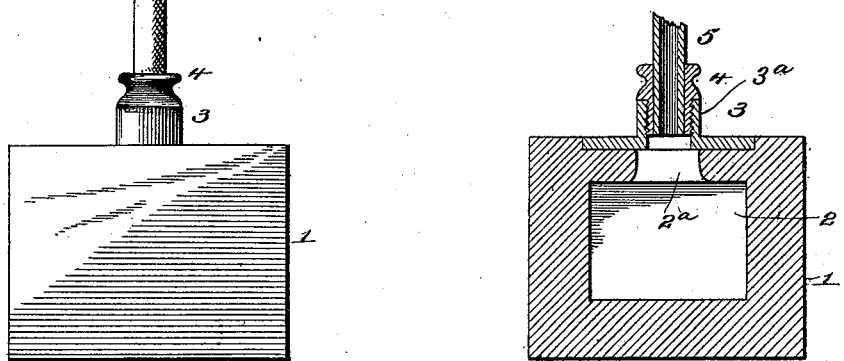
Witnesses:
Harry S. Rohrer
Geo. E. Cruse
Inventors:
Thomas T. Luscombe
William O. Luscombe
By Knight Bros.
Attys.
THE NORRIS PETERS CO., PHOTO-LITHO., WASHINGTON, D. C.

UNITED STATES PATENT OFFICE.

THOMAS T. LUSCOMBE, OF CARTHAGE, MISSOURI, AND WILLIAM O. LUSCOMBE, OF CHICAGO, ILLINOIS.

FILTER.

SPECIFICATION forming part of Letters Patent No. 485,551, dated November 1, 1892.

Application filed April 23, 1892. Serial No. 430,435. (No model.)

*To all whom it may concern:*

Be it known that we, THOMAS T. LUSCOMBE, of Carthage, Jasper county, State of Missouri, and WILLIAM O. LUSCOMBE, of the city of Chicago, Illinois, have invented a certain new and useful Improvement in Suction and Siphon Filters, of which the following is a full, clear, and exact description, reference being had to the accompanying drawings, forming part of this specification.

Our invention relates to a filter provided with a tube through which water may be drawn by suction or siphonic action; and our invention consists in features of novelty hereinafter fully described, and pointed out in the claims.

Figure I is a side elevation illustrating our improvement, and Fig. II is a vertical section through the filter.

Referring to the drawings, 1 represents the filter-block, which is made from a solid piece of tripoli-rock, within which a large central cavity 2, provided with a contracted opening $2^a$, is formed. Cemented or otherwise secured to the top of the block 1 is a flanged plate 3, provided with a perforated nut $3^a$, which is screw-threaded internally and with which a a screw-nut 4 engages.

5 is a flexible tube suitably secured at one end to the screw-nut 4, and 6 is a mouth-piece on the other end of the flexible tube.

The operation of our invention is as follows: The filter-block being placed in water, the water will seep through the porous block of tripoli from the outside into the large cavity formed in the block, from where it may be drawn by suction through the contracted opening and mouth-piece or by siphonic action, as desired. The water having to leave the central cavity through the contracted opening, avoids the possibility of any sediment that may settle on the walls of the chamber from being disturbed.

A filter made in accordance with our invention is very effective in purifying water and forms a neat and handy contrivance for tourists especially, and for others who are often otherwise obliged to drink impure water through not being supplied with a convenient device for filtering the water.

We claim as our invention—

As a new article of manufacture, a water-filter consisting of a block of tripoli-rock having a large interior opening or chamber with a contracted outlet, a plate secured to the block and having a perforated threaded neck, and a flexible hose connected to said plate by a threaded nut, substantially as set forth.

THOMAS T. LUSCOMBE.
WILLIAM O. LUSCOMBE.

T. T. Luscombe signs in presence of—
SAML. McREYNOLDS,
ORVILLE D. ROYSE.

W. O. Luscombe signs in presence of—
L. E. GOODWIN,
E. H. CARPENTER.